Patented Mar. 11, 1947

2,417,220

UNITED STATES PATENT OFFICE 2,417,220

MANUFACTURE OF 2,6-DIMETHYL-HEPTANOIC ACID

Lee Irvin Smith, Minneapolis, Minn., and George F. Rouault, Whiting, Ind., assignors to Regents of the University of Minnesota, Minneapolis, Minn., a corporation of Minnesota No Drawing. Application March 11, 1944,
Serial No. 526,126

5 Claims. (Cl. 260—531)

The present invention relates to methods of producing aliphatic compounds having the formula $(CH_3)_2CHCH_2CH_2CH_2CH(CH_3)COX$ wherein X may be OH, halogen or other groups capable of esterifying an OH group, and more particularly to methods of producing such compounds from available natural unsaturated alcohols and aldehydes. The new products of the invention are particularly useful as intermediates in the synthesis of tocopherol and tocopherol-like compounds as will appear more fully hereinafter.

It is therefore the primary object of the present invention to provide a process of preparing compounds of the formula RCOX, where R is $(CH_3)_2CHCH_2CH_2CH_2CH(CH_3)$ and X may be halogen, OH, or any group capable of forming an ester with an alcohol. It is a further object of the present invention to provide a process of preparing such compounds of the above type from readily available an inexpensive natural source materials.

We have discovered that there are four naturally occurring relatively inexpensive compounds capable of serving as raw materials for the present invention, these raw material compounds being geraniol, having the formula

citral which is the aldehyde corresponding to geraniol, citronellol having the formula

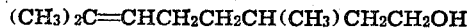

and citronellal, the aldehyde corresponding to citronellol. We have found that by an appropriate series of reactions, these compounds can be converted into the next lower saturated carboxylic acid or derivative with great facility and with high yields by means of the present invention.

In its broader aspects the invention involves the reduction of the selected unsaturated alcohol or aldehyde raw material to the corresponding saturated primary alcohol, the dehydration of the primary alcohol to 3,7-dimethyloctene-1, and finally the oxidation of the 3,7-dimethyloctene-1 to the next lower carboxylic acid or derivative.

While there are a number of methods of reducing the starting materials to the saturated alcohols, we have found it desirable to accomplish this by catalytic hydrogenation under pressure, for example in a bomb. The method set forth in the Journal of Organic Chemistry 4, 334 (1939) may be used for this purpose. The hydrogenation saturates all of the double bonds and at the same time converts the aldehyde group of citral or citronellal, where these are used as the starting material, to the primary alcohol groups. It will be apparent therefore that no matter which of the starting materials are employed, the product after reduction will be 3.7-dimethyloctanol-1. Accordingly a mixture of the aforementioned starting materials may be employed without affecting the continuity or yields in the process and no contaminating side reaction products are thereby induced.

After production of the alcohol, it is then dehydrated to the corresponding olefin. To accomplish this step, the alcohol is first esterified with a higher fatty acid or derivative which is capable of forming an ester which will pyrolize below its boiling point. We have found that the stearate ester is highly desirable for this purpose. The esterification of the octanol may be accomplished by reaction with stearoyl chloride at an elevated temperature, and the stearate thus formed may be pyrolyzed by heating at an elevated temperature but below the boiling point of the stearate. The hydrocarbon (3,7-dimethyloctene-1) formed by such pyrolysis is distilled over as it forms in the pyrolysis and thus separated from the residue in the still. The pyrolysis proceeds with ease and no appreciable amount of ester distills over.

While other methods of dehydrating the primary alcohol to the olefin having a terminal double bond may be available, we have found distinct advantages to be attendant the method just described, for the reaction is not accompanied by any rearrangements, as often happens when powerful dehydrating agents such as sulfuric acid or phosphorus pentoxide are used.

The octene is then oxidized as for example by means of permanganate or ozone, to split the carbon chain at the double bond and convert the hydrocarbon to the next lower acid.

In a further step toward the synthesis of tocopherols, the acid so formed is esterified with p-cresol. For this purpose the acid is converted into the acyl halide as for example the chloride, which may be produced in a conventional manner such as by reaction of the acid with phosphorus pentachloride, thionyl chloride or the like, and the acid chloride is then caused to react with p-cresol to produce the ester p-methylphenyl 2,7-dimethylheptanoate.

The following example will serve to illustrate the invention:

Example

Citronellol was hydrogenated under pressure in the presence of a Raney nickel catalyst. Reduction started at 80-85° C. under an initial hydrogen pressure of about 2000 lbs. The temperature was raised, however, to 120-125° C. to insure completion of the reduction, and was held there until the absorption of hydrogen ceased. The yield was practically quantitative and the product, after removal of the catalyst, would not reduce permanganate. For the reduction of geraniol with its two double bonds, one of them allylic, the temperature was raised to 200° C. and a pressure of 2550 lbs. was used. The perhydrogeraniol produced by the reduction boiled at 98-99° C. under a pressure of 9 mm. and had an index of refraction $n_D^{22}$ 1.4422. Even under the drastic hydrogenation conditions employed for reducing geraniol, a yield of 90% was obtained.

Perhydrogeraniol thus produced was dehydrated to the octene in accordance with the following steps. 242.3 g. (1.164 moles) of pulverized phosphorus pentachloride were added over a period of five minutes to 330.5 g. (1.164 moles) of melted stearic acid. Phosphorus oxychloride was removed from the mixture by distillation under 20 mm. pressure until the temperature reached 150° C. 158 g. (1.0 moles) of perhydrogeraniol were added over a period of five minutes to the warm residue of stearoyl chloride (350 g.). The reaction was completed by heating the mixture at 150° C. for ten minutes. The crude perhydrogeranyl stearate was pyrolized by distillation over a period of 2½ hours at 360° C. (temperature of the liquid) through a seven-inch column packed with glass helices and wrapped with asbestos cord. The distillate was washed with water, dried over calcium chloride and fractionated. 117.5 g. of 3,7-dimethyl-1-octene (84% yield) were obtained, the product having a boiling point of 152° C. at 740 mm. pressure.

The octene so produced was then oxidized to 2,6-dimethyl-heptanoic acid as follows: 37 g. of powdered sodium bicarbonate were added to a solution of 165.5 g. of the above octene dissolved in 1.3 liters of acetone in an apparatus equipped with a Hershberg stirrer. The mixture was cooled to 7° C. and vigorously stirred while 700 g. of powdered potassium permanganate were added in portions over a four-hour period. The acetone was removed by distillation and the residue was diluted with 2 liters of water. Dilute sulfuric acid and about 400 g. of sodium bisulfite were added alternately until the solution became clear. The heptanoic acid was extracted by means of 500 cc. of ether, the ether was evaporated, and the residue (200 cc.) was fractionated. 83.5 g. of the heptanoic acid (45% yield) having a boiling point of 115° C. at 3 mm. pressure were obtained.

This amount of heptanoic acid (0.528 mole) was converted to the acyl chloride by action of 110 g. (0.528 mole) of phosphorus pentachloride. The phosphorus oxychloride was removed by distillation at a pressure of 20 mm. from a water bath at 65° C. The crude acyl chloride weighed 93 g. (100% yield).

The product of the present invention is particularly suitable as an intermediate in the production of tocopherols and the like. In our application Ser. No. 826,127 filed of even date herewith and entitled "Process of making long chain intermediates" there is described a process of converting the heptanoic acid described above and p-cresol into 1-bromo-4,8,12-trimethyltridecane, which has been shown to be convertible into tocopherol and tocopherol-like compounds in accordance with the teachings of the applications of Lee Irvin Smith and Joseph A. Sprung, Ser. No. 453,279, filed August 1, 1942, and Ser. No. 456,791, filed August 31, 1942.

While a detailed description of the invention has been set forth, it is to be understood that the same is not limited thereto but may be varied within the scope of the appended claims.

What we claim is:

1. Process of preparing compounds having the 2,6-dimethylheptanoyl radical from a compound of the group consisting of geraniol, citral, citronellol and citronellal which comprises reducing said compound to the corresponding saturated primary alcohol, esterifying the alcohol with a higher fatty acid, pyrolizing the ester to the olefin, 3,7-dimethyloctene-1 and oxidizing the olefin to the next lower saturated carboxylic acid.

2. Process of preparing compounds having the 2,6-dimethylheptanoyl radical from a compound of the group consisting of geraniol, citral, citronellol and citronellal which comprises catalytically hydrogenating said compound to the corresponding saturated primary alcohol, esterifying said alcohol with a higher fatty acid, pyrolizing the resultant ester to the olefin, 3,7-dimethyloctene-1, and oxidizing said olefin to the next lower saturated carboxylic acid.

3. Process of preparing compounds having the 2,6-dimethylhepthanoyl radical from a compound of the group consisting of geraniol, citral, citronellol and citronellal which comprises reducing said compound to the corresponding saturated primary alcohol, converting said alcohol to the stearate, pyrolizing said stearate to the olefin, 3,7-dimethyloctene-1, and oxidizing said olefin to the next lower saturated carboxylic acid.

4. Process of preparing compounds having the 2,6-dimethylheptanoyl radical from a compound of the group consisting of geraniol, citral, citronellol and citronellal which comprises catalytically hydrogenating said compound to the corresponding saturated primary alcohol, converting said alcohol to the stearate, pyrolizing said stearate to the olefin, 3,7-dimethyloctene-1, and oxidizing said olefin to the next lower saturated carboxylic acid.

5. Process of preparing compounds having the 2,6-dimethylheptanoyl radical from a compound of the group consisting of geraniol, citral, citronellol and citronellal which comprises reducing said compound to the corresponding saturated primary alcohol, converting said alcohol to the stearate, pyrolizing said stearate to the olefin, 3,7-dimethyloctene-1, and ozonizing said olefin to convert it to the next lower saturated carboxylic acid.

LEE IRVIN SMITH.
GEORGE F. ROUAULT.

REFERENCES CITED

The following references are of record in the file of this patent:

UNITED STATES PATENTS

| Number | Name | Date |
|---|---|---|
| 2,009,948 | Schmidt | July 30, 1935 |
| 2,060,267 | Toussaint | Nov. 10, 1936 |
| 2,175,556 | Cox | Oct. 10, 1939 |
| 2,304,872 | Bachman et al. | Dec. 15, 1942 |
| 2,339,259 | English et al. | Jan. 8, 1944 |
| 2,000,878 | Britton et al. | May 7, 1935 |

FOREIGN PATENTS

| Number | Country | Date |
|---|---|---|
| 274,076 | British | Oct. 1, 1928 |
| 397,161 | British | Aug. 3, 1933 |

OTHER REFERENCES

Rupe et al., Chem. Abstracts, vol. 18, pg. 2148 (1924). Braun et al., Chem. Abstracts, vol. 23, pg. 2934, (1929). (Copies in Scientific Library.)